(12) United States Patent　　(10) Patent No.: US 12,656,786 B2
Iwase　　(45) Date of Patent: Jun. 16, 2026

(54) AUTOMATIC TRAVELING SYSTEM, AUTOMATIC TRAVELING METHOD, AND AUTOMATIC TRAVELING PROGRAM

(71) Applicant: Yanmar Holdings Co., Ltd., Osaka (JP)

(72) Inventor: Takuya Iwase, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 224 days.

(21) Appl. No.: 18/265,047

(22) PCT Filed: Nov. 29, 2021

(86) PCT No.: PCT/JP2021/043532
　　§ 371 (c)(1),
　　(2) Date: Jun. 2, 2023

(87) PCT Pub. No.: WO2022/118773
　　PCT Pub. Date: Jun. 9, 2022

(65) Prior Publication Data
　　US 2024/0023473 A1　　Jan. 25, 2024

(30) Foreign Application Priority Data

Dec. 2, 2020　(JP) ................................. 2020-200356

(51) Int. Cl.
　　*G05D 1/622*　　(2024.01)
　　*A01B 69/04*　　(2006.01)
　　(Continued)

(52) U.S. Cl.
　　CPC ........... *G05D 1/622* (2024.01); *A01B 69/008* (2013.01); *B60W 30/0956* (2013.01);
　　(Continued)

(58) Field of Classification Search
　　CPC .... G05D 1/622; G05D 1/0214; G05D 1/2424; G05D 2105/15; G05D 2109/10; A01B 69/008; B60W 30/0956; B60R 1/27
　　See application file for complete search history.

(56) References Cited

U.S. PATENT DOCUMENTS 10,913,453 B2 * 2/2021 Min ...................... B60W 30/09
2010/0114405 A1 5/2010 Elston et al.
(Continued)

FOREIGN PATENT DOCUMENTS

DE　　102016117712 A1 * 3/2018 ............. G08G 1/168
JP　　　2015225615 A * 12/2015 ........ B60W 30/0956
(Continued)

OTHER PUBLICATIONS

Translation of JP-2015225615-A, 15 pages (Year: 2015).*
(Continued)

*Primary Examiner* — Dale W Hilgendorf
(74) *Attorney, Agent, or Firm* — NORTON ROSE FULBRIGHT US LLP

(57) ABSTRACT

An acquisition processing part acquires detection information from a first obstacle sensor which detects an obstacle in a first detection area, and a second obstacle sensor which detects an obstacle in a second detection area. When an obstacle is detected in the first detection area, a traveling processing part executes travel restriction of a work vehicle. When the obstacle enters a non-detection area from the first detection area in a state in which the work vehicle is under the travel restriction, a determination processing part determines whether or not the obstacle further enters the second detection area from the non-detection area. When it is determined that the obstacle enters the second detection area from the non-detection area, the traveling processing part continues the travel restriction of the work vehicle.

9 Claims, 10 Drawing Sheets

(51) Int. Cl.

| | |
|---|---|
| *B60R 1/27* | (2022.01) |
| *B60W 30/095* | (2012.01) |
| *G05D 1/00* | (2024.01) |
| *G05D 1/242* | (2024.01) |
| *G05D 105/15* | (2024.01) |
| *G05D 109/10* | (2024.01) |

(52) U.S. Cl.
CPC ......... *G05D 1/0214* (2013.01); *G05D 1/2424* (2024.01); *B60R 1/27* (2022.01); *G05D 2105/15* (2024.01); *G05D 2109/10* (2024.01)

(56) References Cited

U.S. PATENT DOCUMENTS

| | | | | |
|---|---|---|---|---|
| 2014/0327776 | A1* | 11/2014 | Michiguchi | G08G 1/166 |
| | | | | 348/148 |
| 2019/0003137 | A1* | 1/2019 | Gao | G05D 1/69 |
| 2019/0202388 | A1* | 7/2019 | Sonoura | G05D 1/2424 |
| 2020/0064483 | A1* | 2/2020 | Li | G01S 13/867 |
| 2020/0398866 | A1* | 12/2020 | Hara | B60W 50/14 |
| 2021/0197811 | A1* | 7/2021 | Tsushima | G08G 1/167 |
| 2023/0127044 | A1* | 4/2023 | Takagi | B60W 30/09 |
| | | | | 701/301 |
| 2023/0128234 | A1* | 4/2023 | Okabe | G01S 13/08 |
| | | | | 701/301 |
| 2023/0294672 | A1* | 9/2023 | Kato | B60W 50/14 |
| | | | | 701/301 |
| 2025/0271854 | A1* | 8/2025 | Saunders | H04W 4/38 |

FOREIGN PATENT DOCUMENTS

| | | |
|---|---|---|
| JP | 2018-174890 A | 11/2018 |
| JP | 2019-098788 A | 6/2019 |
| JP | 2019-175050 A | 10/2019 |
| JP | 2020-042419 A | 3/2020 |

OTHER PUBLICATIONS

Translation of DE-102016117712-A1, 8 pages (Year: 2018).*
International Search Report dated Feb. 15, 2022 issued in corresponding PCT Application PCT/JP2021/043532.

* cited by examiner

| OBSTACLE SENSOR ID | INSTALLATION POSITION | INSTALLATION COORDINATES |
|---|---|---|
| SS1 | CENTER FRONT | X1, Y1 |
| SS2 | CENTER REAR | X2, Y2 |
| SS3 | LEFT SIDE | X3, Y3 |
| SS4 | RIGHT SIDE | X4, Y4 |

| TIME INFORMATION | OBSTACLE DETECTION POSITION | | | | OBSTACLE POSITION |
|---|---|---|---|---|---|
| | SS1 | SS2 | SS3 | SS4 | |
| t1 | − | − | − | − | − |
| t2 | X11, Y11 | − | − | − | Xb1, Yb1 |
| t3 | X12, Y12 | − | − | − | Xb2, Yb2 |
| t4 | X13, Y13 | − | − | − | Xb3, Yb3 |
| t5 | − | − | − | − | Xb4, Yb4 |
| t6 | − | − | − | − | Xb5, Yb5 |
| t7 | − | − | − | − | Xb6, Yb6 |
| t8 | − | − | − | − | Xb7, Yb7 |
| t9 | − | − | − | X41, Y41 | Xb8, Yb8 |
| t10 | − | − | − | X42, Y42 | Xb9, Yb9 |
| t11 | − | − | − | X43, Y43 | Xb10, Yb10 |
| ⋮ | ⋮ | ⋮ | ⋮ | ⋮ | ⋮ |

Tr1

AUTOMATIC TRAVELING SYSTEM, AUTOMATIC TRAVELING METHOD, AND AUTOMATIC TRAVELING PROGRAM

CROSS-REFERENCE TO RELATED APPLICATIONS

This application is a national stage application pursuant to 35 U.S.C. § 371 of International Application No. PCT/JP2021/043532, filed on Nov. 29, 2021, which claims priority under 35 U.S.C. § 119 to Japanese Patent Application No. 2020-200356 filed on Dec. 2, 2020, the disclosures of which are hereby incorporated by reference in their entireties.

TECHNICAL FIELD

The present invention relates to an automatic traveling system, an automatic traveling method, and an automatic traveling program that cause a work vehicle to automatically travel.

BACKGROUND ART

Work vehicles are equipped with obstacle sensors such as infrared sensors and ultrasonic sensors to detect obstacles in detection areas during automatic travel. Such a detection area is, for example, set in a fan shape within a predetermined distance (e.g., 10 m) in front of an obstacle sensor in plan view. For example, Patent Literature 1 discloses a configuration in which obstacle sensors are installed not only at the front of a work vehicle but also at the rear and sides of the work vehicle to enable detection of obstacles over a wide area.

CITATION LIST

Patent Literature

Patent Literature 1: Japanese Patent Laid-open Publication No. 2018-174890

DISCLOSURE OF INVENTION

Problems to be Solved by the Invention

However, in the conventional technology, when adjacent first and second detection areas are separated by a predetermined distance, a region along the predetermined distance is a blind area or a non-detection area in which obstacles are not detected. Therefore, for example, if an obstacle enters the non-detection area from the first detection area after a work vehicle detects the obstacle in the first detection area and then transitions to deceleration travel, the deceleration travel is canceled, and the work vehicle transitions to normal travel. If the obstacle then further enters the second detection area from the non-detection area, the work vehicle again transitions to deceleration travel. This causes a problem of unstable traveling of the work vehicle due to the positional relationship between the detection areas, the non-detection area, and the obstacle.

An object of the present invention is to provide an automatic traveling system, an automatic traveling method, and an automatic traveling program that can improve the traveling stability of a work vehicle that has detected an obstacle while the safety of the work vehicle is secured.

Means for Solving the Problems

The automatic traveling system of the present invention includes an acquisition processing part, a detection processing part, a traveling processing part, and a determination processing part. The acquisition processing part acquires detection information from a first detection part and a second detection part, the first detection part detecting an obstacle in a first detection area set around a work vehicle, the second detection part detecting an obstacle in a second detection area set with a non-detection area provided in at least a portion of an area between the first detection area and the second detection area. The detection processing part detects the obstacle on a basis of the detection information acquired by the acquisition processing part. The traveling processing part executes a travel restriction of the work vehicle when the obstacle is detected in the first detection area by the detection processing part. The determination processing part determines whether or not the obstacle is going to further enter the second detection area from the non-detection area when the obstacle enters the non-detection area from the first detection area while the travel restriction is imposed on the work vehicle by the traveling processing part. The traveling processing part continues the travel restriction of the work vehicle when the obstacle is determined to be going to enter the second detection area from the non-detection area by the determination processing part.

The automatic traveling method of the present invention includes: acquiring detection information from a first detection part and a second detection part, the first detection part detecting an obstacle in a first detection area set around a work vehicle, the second detection part detecting an obstacle in a second detection area set with a non-detection area provided in at least a portion of an area between the first detection area and the second detection area; detecting the obstacle on the basis of the detection information and executing a travel restriction of the work vehicle when the obstacle is detected in the first detection area; determining whether or not the obstacle is going to further enter the second detection area from the non-detection area when the obstacle enters the non-detection area from the first detection area while the travel restriction is imposed on the work vehicle; and continuing the travel restriction of the work vehicle when the obstacle is determined to be going to enter the second detection area from the non-detection area.

The automatic traveling program of the present invention causing one or more processor to execute: acquiring detection information from a first detection part and a second detection part, the first detection part detecting an obstacle in a first detection area set around a work vehicle, the second detection part detecting an obstacle in a second detection area set with a non-detection area provided in at least a portion of an area between the first detection area and the second detection area; detecting the obstacle on the basis of the detection information and executing a travel restriction of the work vehicle when the obstacle is detected in the first detection area; determining whether or not the obstacle is going to further enter the second detection area from the non-detection area when the obstacle enters the non-detection area from the first detection area while the travel restriction is imposed on the work vehicle; and continuing the travel restriction of the work vehicle when the obstacle is determined to be going to enter the second detection area from the non-detection area.

Effect of the Invention

According to the present invention, it is possible to provide an automatic traveling system, an automatic traveling method, and an automatic traveling program that can improve traveling stability of a work vehicle that has detected an obstacle while the safety of the work vehicle is secured.

BRIEF DESCRIPTION OF DRAWINGS

FIG. 5 is a diagram illustrating an example of sensor information used in an automatic traveling system according to an embodiment of the present invention.

FIG. 6 is a diagram illustrating an example of detection information used in an automatic traveling system according to an embodiment of the present invention.

DESCRIPTION OF EMBODIMENTS

The following embodiments are examples that embody the present invention and are not intended to limit the technical scope of the present invention.

Figure 1:
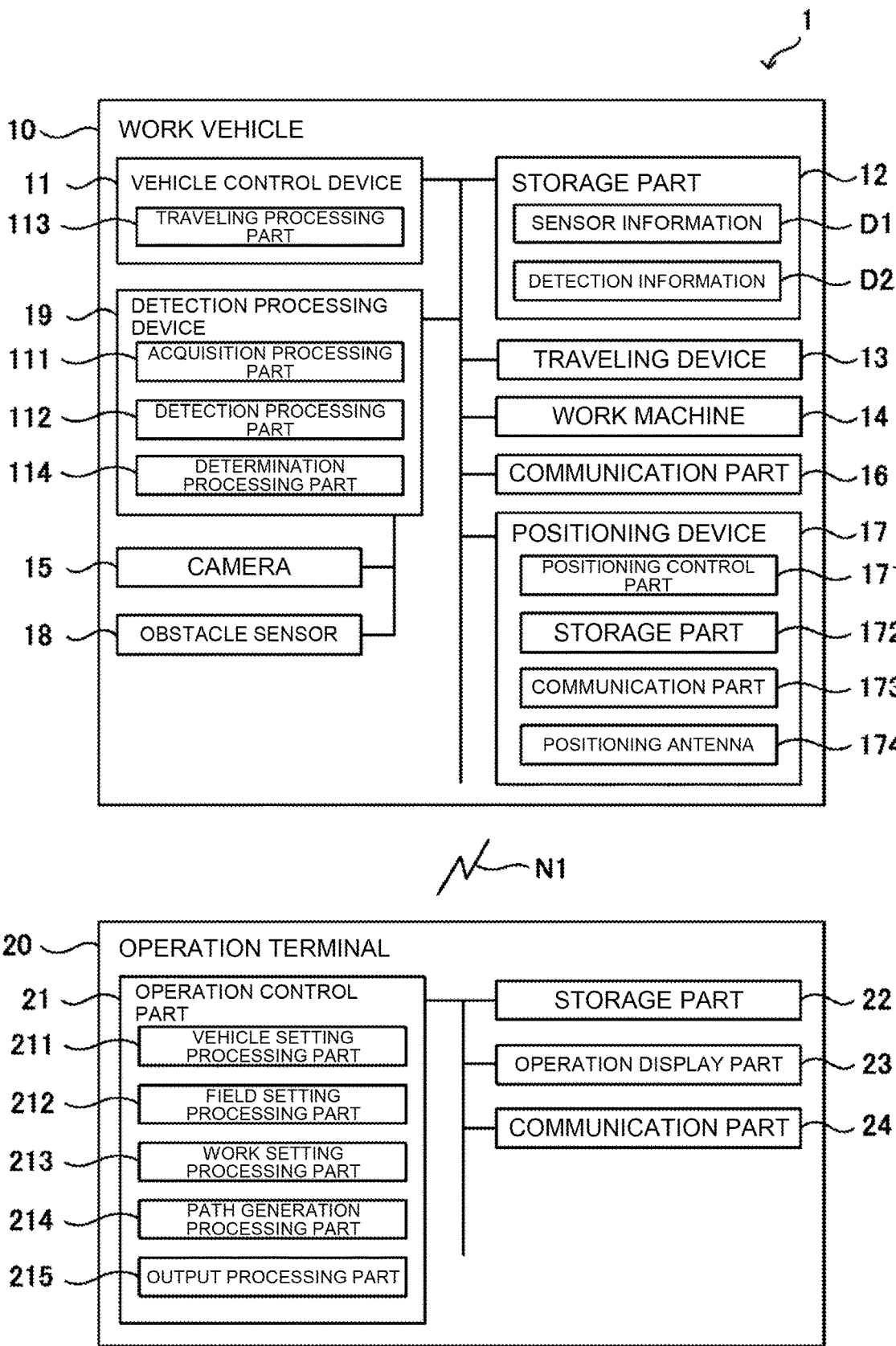
FIG. 1 is a block diagram illustrating a configuration of an automatic traveling system according to an embodiment of the present invention.

As illustrated in FIG. 1, an automatic traveling system 1 according to an embodiment of the present invention includes a work vehicle 10 and an operation terminal 20. The work vehicle 10 and the operation terminal 20 can communicate with each other via a communication network N1. For example, the work vehicle 10 and the operation terminal 20 can communicate with each other via a portable telephone line network, a packet line network, or a wireless LAN.

The present embodiment describes an example in which the work vehicle 10 is a tractor. As another embodiment, the work vehicle 10 may be a rice transplanter, a combine, a construction machine, a snowplow, or the like. The work vehicle 10 is a so-called robot tractor having a configuration that enables automatic travel (autonomous travel) in a field F (see FIG. 3) along a predetermined travel route R. For example, the work vehicle 10 can automatically travel along the travel route R that is generated for the farm field F in advance on the basis of position information on a current position of the work vehicle 10, which is calculated by a positioning device 17.

Figure 3:
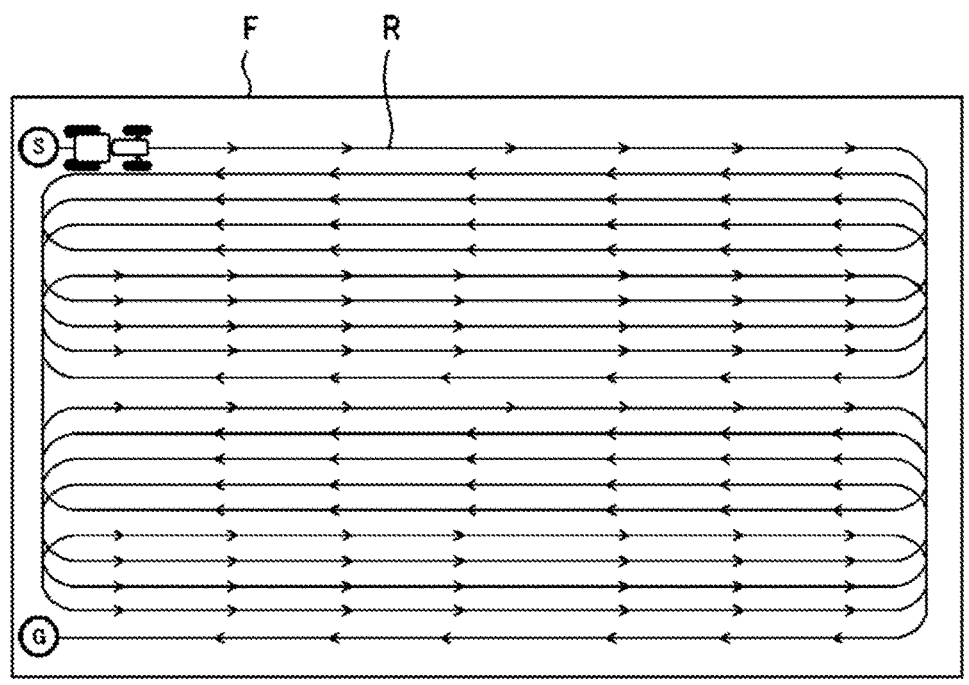
FIG. 3 is a diagram illustrating an example of a travel route of the work vehicle according to an embodiment of the present invention.

For example, the work vehicle 10 travels back and forth in parallel from a work start position S to a work end position G in the work region in the field F illustrated in FIG. 3. The outer periphery of the field F is, for example, a headland region where the work vehicle 10 turns. The travel route R is not limited to the route illustrated in FIG. 3 but can be set as appropriate in accordance with work content.

Work Vehicle 10

Figure 2:
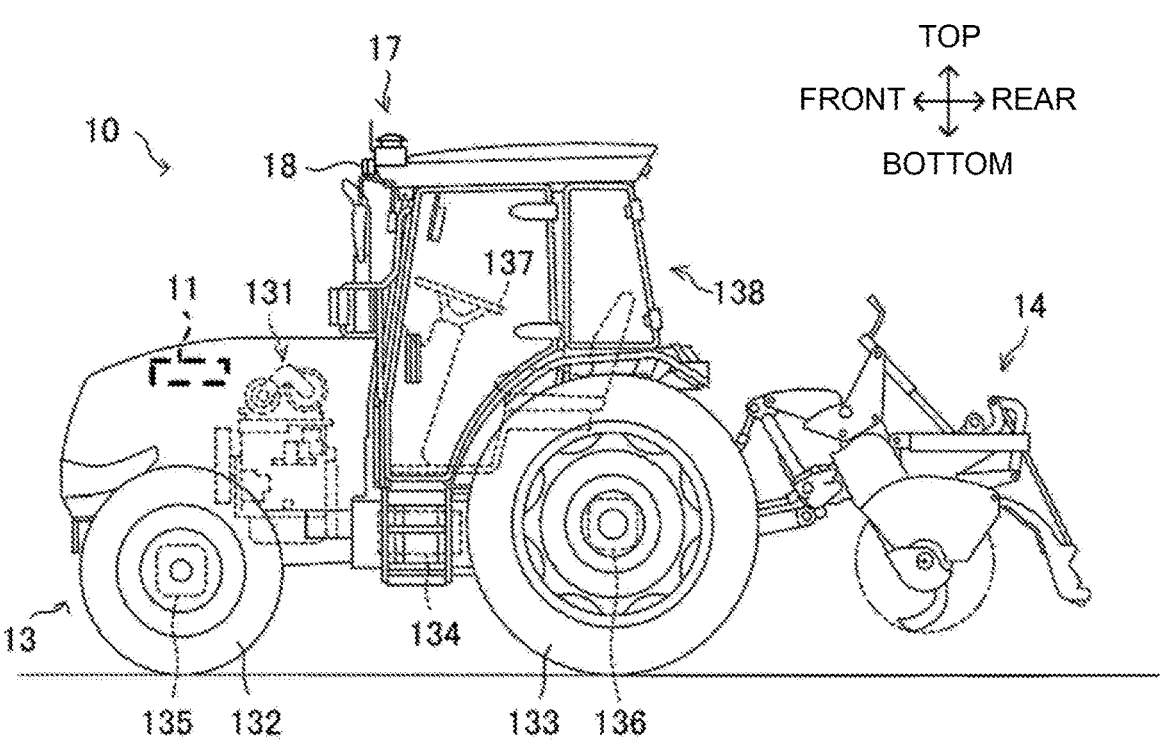
FIG. 2 is an external view illustrating an example of a work vehicle according to an embodiment of the present invention.

As illustrated in FIGS. 1 and 2, the work vehicle 10 includes a vehicle control device 11, a storage part 12, a traveling device 13, a work machine 14, a camera 15, a communication part 16, a positioning device 17, obstacle sensors 18, and a detection processing device 19. The vehicle control device 11 is electrically connected to the storage part 12, the traveling device 13, the work machine 14, the positioning device 17, and the like. The vehicle control device 11 and the positioning device 17 may be capable of wireless communication. The camera 15 and the obstacle sensors 18 are electrically connected to the detection processing device 19.

The storage part 12 is a non-volatile storage part such as a hard disk drive (HDD) or a solid state drive (SSD) that stores various types of information. The storage part 12 stores control programs such as an automatic traveling program for causing the vehicle control device 11 to execute an automatic traveling process described below (see FIG. 8). For example, the automatic traveling program is non-transitorily recorded in a computer-readable recording medium such as a CD or a DVD, and is read by a predetermined reading part (not illustrated) to be stored in the storage part 12. The automatic traveling program may be downloaded from a server (not illustrated) to the work vehicle 10 via the communication network N1 to be stored in the storage part 12. Data of the travel route R generated in the operation terminal 20 is stored in the storage part 12. Data such as sensor information D1 (see FIG. 5) and detection information D2 (see FIG. 6) described later is also stored in the storage part 12.

The traveling device 13 is a drive part that causes the work vehicle 10 to travel. As illustrated in FIG. 2, the traveling device 13 includes an engine 131, front wheels 132, rear wheels 133, a transmission 134, a front axle 135, a rear axle 136, and a steering wheel 137. The front wheels 132 and the rear wheels 133 are provided on the left and right sides of the work vehicle 10. The traveling device 13 is not limited to be of a wheel type including the front wheels 132 and the rear wheels 133 but may be of a crawler type including crawlers that are provided to the left and right sides of the work vehicle 10.

The engine 131 is a drive source, such as a diesel engine or a gasoline engine, that is driven by using fuel supplied to a fuel tank (not illustrated). In addition to or in place of the engine 131, the traveling device 13 may include an electric motor as the drive source. A generator (not illustrated) is connected to the engine 131, and electric power is supplied from the generator to electrical components such as the vehicle control device 11 and batteries of the work vehicle 10. The batteries are charged by electric power that is supplied from the generator. The electrical components such as the vehicle control device 11 and the positioning device 17 of the work vehicle 10 can be driven by the electric power supplied from the batteries even after the engine 131 is stopped.

The driving force of the engine 131 is transmitted to the front wheels 132 via the transmission 134 and the front axle 135 and is transmitted to the rear wheels 133 via the transmission 134 and the rear axle 136. The driving force of the engine 131 is also transmitted to the work machine 14 via a PTO shaft (not illustrated). When the work vehicle 10 is automatically traveling, the traveling device 13 performs a travel operation in accordance with commands from the vehicle control device 11. The traveling device 13 decelerates or stops the work vehicle 10 in accordance with the commands from the vehicle control device 11.

The work machine 14 is, for example, a cultivator, a mower, a plow, a fertilizer, a sprayer (chemical sprayer), a puddling machine, or a seeder, which can be removably mounted to the work vehicle 10. This allows the work vehicle 10 to perform various types of work by using different work machines 14. FIG. 2 illustrates a case in which the work machine 14 is a cultivator. For example, the work machine 14 is mounted to the rear of the work vehicle 10. The work vehicle 10 performs cultivation work by traveling in a field with the work machine 14 mounted to the rear.

The obstacle sensors 18 are sensors that detect obstacles in predetermined detection areas by using infrared, ultrasonic, or the like. For example, the obstacle sensors 18 may be lidar sensors (distance sensors) that can three-dimensionally measure the distances to measurement targets (obstacles) by using lasers, or sonar sensors including multiple sonars that can measure the distances to measurement targets by using ultrasonic waves. The obstacle sensors 18 are installed in the center front, center rear, right side, and left side of the work vehicle 10 (see FIGS. 2 and 4) to monitor the surroundings of the work vehicle 10 and detect obstacles. The obstacle sensors 18 detect objects, people, etc., as obstacles.

Figure 4:
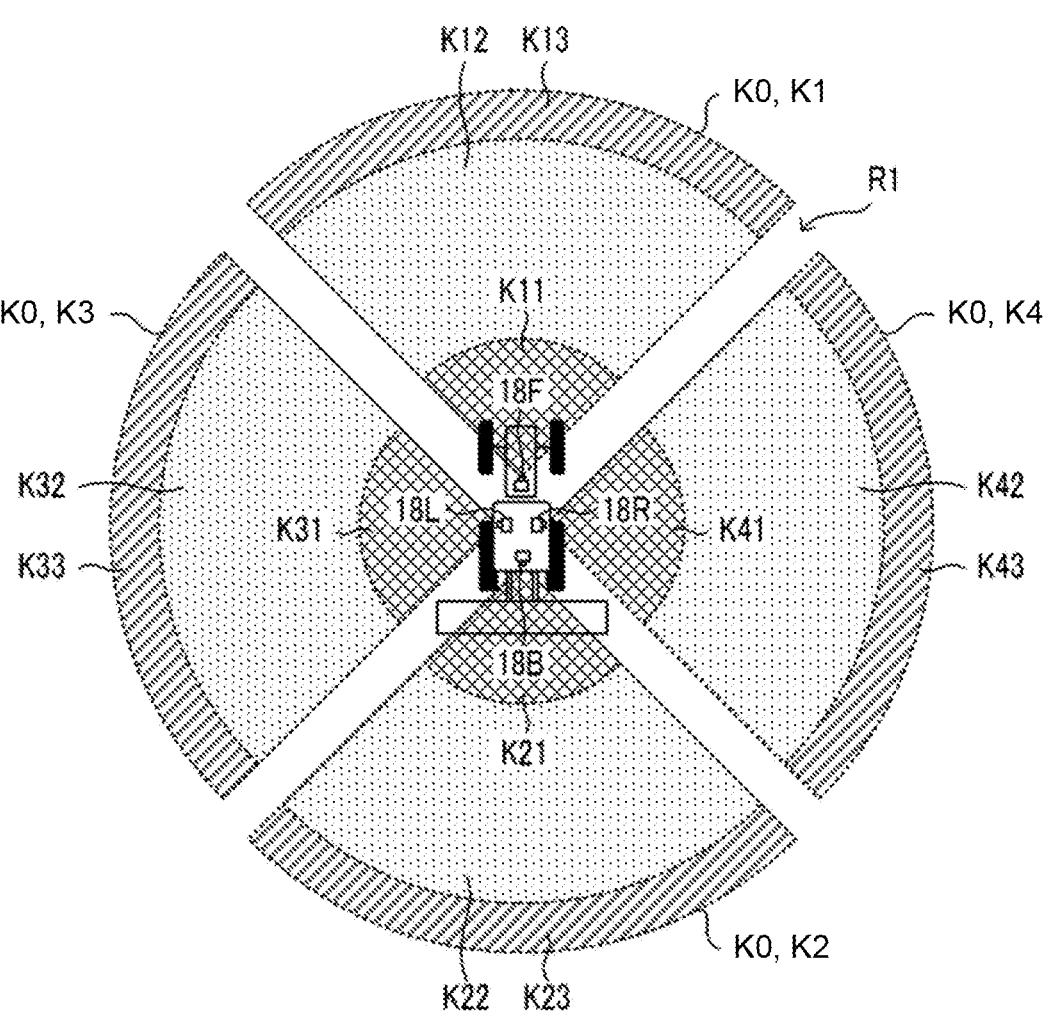
FIG. 4 is a diagram illustrating an example of positions and detection areas of obstacle sensors installed on a work vehicle according to an embodiment of the present invention.

The obstacle sensors 18 are able to detect obstacles in preset detection areas. For example, as illustrated in FIG. 4, it is possible to set an area to be monitored (detection area) for controlling the travel of the work vehicle 10 in a fan-shaped detectable area K0 within a predetermined angle (e.g., 90 degrees) for each obstacle sensor 18. For example, the detection processing device 19 sets the detection area on the basis of predetermined conditions as described below. For example, the detection processing device 19 can also set the detection area on the basis of an operator's setting manipulation.

For example, the detection processing device 19 sets a monitoring target detection area K1 in a detectable area K0 of an obstacle sensor 18F installed in the center front of the work vehicle 10, sets a monitoring target detection area K2 in a detectable area K0 of an obstacle sensor 18B installed in the center rear of the work vehicle 10, sets a monitoring target detection area K3 in a detectable area K0 of an obstacle sensor 18L installed on the left side of the work vehicle 10, and sets a monitoring target detection area K4 in a detectable area K0 of an obstacle sensor 18R installed on the right side of the work vehicle 10. In the example illustrated in FIG. 4, the entire detectable area K0 corresponding to obstacle sensor 18F is set to be the detection area K1, the entire detectable area K0 corresponding to obstacle sensor 18B is set to be the detection area K2, the entire detectable area K0 corresponding to obstacle sensor

18L is set to be the detection area K3, and the entire detectable area K0 corresponding to obstacle sensor 18R is set to be the detection area K4. Alternatively, each of the detection areas K1 to K4 may be set as part of each detectable area K0.

The detection area K1 includes a detection area closest to the work vehicle 10 ("stop area K11"), a detection area further forward than the stop area K11 ("deceleration area K12"), and a detection area further forward than the deceleration area K12 ("announcement area K13"). For example, the stop area K11 is a range approximately two meters forward from the work vehicle 10, the deceleration area K12 is a range approximately six meters forward from the stop area K11, and the announcement area K13 is a range approximately two meters forward from the deceleration area K12. Similarly, the detection area K2 includes a detection area closest to the work vehicle 10 ("stop area K21"), a detection area further rearward than the stop area K21 ("deceleration area K22"), and a detection area further forward than the deceleration area K22 ("announcement area K23"). The detection area K3 includes a detection area closest to the work vehicle 10 ("stop area K31"), a detection area further forward than the stop area K31 ("deceleration area K32"), and a detection area further forward than the deceleration area K32 ("announcement area K33"). The detection area K4 includes a detection area closest to the work vehicle 10 ("stop area K41"), a detection area further forward than the stop area K41 ("deceleration area K42"), and a detection area further forward than the deceleration area K42 ("announcement area K43").

Each obstacle sensor 18 transmits measurement information (example of detection information of the present invention) to the detection processing device 19. The detection processing device 19 detects obstacles and specifies the positions of the obstacles on the basis of the measurement information acquired from the respective obstacle sensors 18. The detection processing device 19 issues an external alarm when an obstacle is detected in any of the announcement areas K13, K23, K33, and K43 while the work vehicle 10 is traveling automatically. When the detection processing device 19 detects obstacles in of the deceleration area K12, K22, K32, and K42 while the work vehicle 10 is traveling automatically, the vehicle control device 11 executes a travel restriction to decelerate the work vehicle 10. When the detection processing device 19 detects obstacles in the stop areas K11, K21, K31, and K41 while the work vehicle 10 is travelling automatically, the vehicle control device 11 executes a travel restriction to stop the work vehicle 10.

The operator can install the obstacle sensors 18 at desired positions depending on the work content. The obstacle sensors 18 are examples of a detection part of the present invention.

The detection processing device 19 can communicate with the obstacle sensors 18 when the obstacle sensors 18 are electrically connected to the work vehicle 10. Once the detection processing device 19 is able to communicate with the obstacle sensors 18, it acquires the number of obstacle sensors 18, identification information (device information) for each obstacle sensor 18, and installation position information. The detection processing device 19 stores the sensor information D1 including each of the pieces of information acquired from the obstacle sensors 18 in the storage part 12.

FIG. 5 illustrates an example of the sensor information D1. The sensor information D1 includes information such as obstacle sensor IDs, installation positions, and installation coordinates. The obstacle sensor IDs are identification information of the obstacle sensors 18. The installation positions are the installation positions of the obstacle sensors 18 of the work vehicle 10. The installation coordinates are the position coordinates of the obstacle sensors 18 relative to a reference point (e.g., center point) of the work vehicle 10 in an XY coordinate plane. In FIG. 5, an obstacle sensor ID "SS1" indicates the obstacle sensor 18F, an obstacle sensor ID "SS2" indicates the obstacle sensor 18B, an obstacle sensor ID "SS3" indicates the obstacle sensor 18L, and an obstacle sensor ID "SS4" indicates the obstacle sensor 18R.

The camera 15 is a digital camera that captures images of a subject and outputs them as digital image data. The camera 15 continuously captures images of the subject at a predetermined frame rate, generates frame images in a predetermined resolution, and sequentially transmits the frame images to the detection processing device 19.

The steering wheel 137 is a manipulation part that is manipulated by an operator or the vehicle control device 11. For example, in the traveling device 13, the angle of the front wheels 132 is changed by a hydraulic power steering mechanism or the like (not illustrated) in response to manipulation of the steering wheel 137 by the vehicle control device 11, and the advancing direction of the work vehicle 10 is changed.

In addition to the steering wheel 137, the traveling device 13 includes a shift lever, an accelerator, a brake, and the like (not illustrated) that are manipulated by the vehicle control device 11. In the traveling device 13, a gear of the transmission 134 is switched to a forward gear, a reverse gear, or the like in accordance with manipulation of the shift lever by the vehicle control device 11 to switch the travel mode of the work vehicle 10 to forward travel, reverse travel, or the like. The vehicle control device 11 manipulates the accelerator to control the speed of the engine 131. The vehicle control device 11 manipulates the brake to control the rotation of the front wheels 132 and the rear wheels 133 by using an electromagnetic brake.

The positioning device 17 is a communication device including a positioning control part 171, a storage part 172, a communication part 173, and a positioning antenna 174. For example, as illustrated in FIG. 2, the positioning device 17 is provided on top of a cabin 138 where an operator is to board. The installation site of the positioning device 17 is not limited to the cabin 138. Moreover, the positioning control part 171, the storage part 172, the communication part 173, and the positioning antenna 174 of the positioning device 17 may be separately arranged in different positions in the work vehicle 10. As described above, a battery is connected to the positioning device 17, and the positioning device 17 can be operated even when the engine 131 is stopped. For example, a mobile phone terminal, a smartphone, a tablet terminal, or the like may be used in place of the positioning device 17.

The positioning control part 171 is a computer system that includes one or more processors and a storage memory such as a non-volatile memory and a RAM. The storage part 172 is a non-volatile memory or the like that stores a program for causing the positioning control part 171 to execute a positioning process and data such as positioning information and movement information. For example, the program, which is non-transiently recorded in a computer-readable recording medium such as a CD or a DVD, is read by a predetermined reading device (not illustrated) and stored in the storage part 172. The program may be downloaded to the positioning device 17 from a server (not illustrated) via the communication network N1 and stored in the storage part 172.

The communication part 173 is a communication interface that connects the positioning device 17 to the communication network N1 in a wired or wireless manner, and performs data communication with an external device such as a base station server via the communication network N1 in accordance with a predetermined communication protocol.

The positioning antenna 174 is an antenna to receive radio waves (GNSS signals) transmitted from satellites.

The positioning control part 171 calculates the current position of the work vehicle 10 on the basis of the GNSS signals from the satellites that are received by the positioning antenna 174. For example, when the positioning antenna 174 receives radio waves (emission time, orbit information, and the like) emitted from multiple satellites while the work vehicle 10 travels automatically in the field F, the positioning control part 171 calculates the distance between the positioning antenna 174 and each of the satellites and on the basis of the calculated distances calculates the current position (latitude and longitude) of the work vehicle 10. Alternatively, the positioning control part 171 may adopt a real-time kinematic positioning method (RTK-GPS positioning method (RTK method)) to calculate the current position of the work vehicle 10 by using correction information that corresponds to the base station (reference station) near the work vehicle 10. In this way, the work vehicle 10 travels automatically by using the positioning information acquired through the RTK method.

The vehicle control device 11 and the detection processing device 19 each includes control devices such as a CPU, a ROM, and a RAM. The CPU is a processor that executes various arithmetic processes. The ROM is a non-volatile storage part that preliminarily stores control programs such as a BIOS and an OS for causing the CPU to execute the various arithmetic processes. The RAM is a volatile or non-volatile storage part that stores various types of information and is used as a transient storage memory (workspace) for the various processes executed by the CPU. The vehicle control device 11 and the detection processing device 19 cause the CPU to execute various control programs preliminarily stored in the ROM or the storage part 12 to control the work vehicle 10. The vehicle control device 11 controls the operation of the work vehicle 10 in response to various user's manipulation on the work vehicle 10. The vehicle control device 11 also executes an automatic traveling process of the work vehicle 10 on the basis of the current position of the work vehicle 10 calculated by the positioning device 17 and the travel route R generated in advance.

As illustrated in FIG. 1, the detection processing device 19 includes various processing parts such as an acquisition processing part 111, a detection processing part 112, a determination processing part 114. The vehicle control device 11 includes various processing parts such as a traveling processing part 113. The vehicle control device 11 and the detection processing device 19 causes the CPU to execute various processes in accordance with the automatic traveling program to function as the various processing parts. Some or all of the processing parts may be composed of an electronic circuit. The automatic traveling program may be a program for causing multiple processors to function as the processing parts.

The acquisition processing part 111 acquires measurement information from the obstacle sensors 18. For example, the acquisition processing part 111 acquires the measurement information of the detection area K1 from the obstacle sensor 18F installed in the center front of the work vehicle 10. For example, when an obstacle enters the detection area K1, the acquisition processing part 111 acquires the measurement distance (the distance from the obstacle sensor 18F to the obstacle) measured by the obstacle sensor 18F. Similarly, the acquisition processing part 111 acquires the measurement information of the detection area K2 from the obstacle sensor 18B installed in the center rear of the work vehicle 10, acquires the measurement information of the detection area K3 from the obstacle sensor 18L installed on the left side of the work vehicle 10, and acquires the measurement information of the detection area K4 from the obstacle sensor 18R installed on the right side of the work vehicle 10.

The acquisition processing part 111 acquires captured images from one or more cameras 15. The acquisition processing part 111 stores the acquired captured images in the storage part 12 together with the image capturing times. The acquisition processing part 111 outputs image data on the acquired captured images to the operation terminal 20.

The detection processing part 112 detects an obstacle on the basis of the measurement information acquired by the acquisition processing part 111. Specifically, the detection processing part 112 determines whether or not a detection area contains an obstacle on the basis of the measurement information. The detection processing part 112 outputs the detection results to the operation terminal 20.

The detection processing part 112 stores the detection information D2 including the measurement information acquired from the obstacle sensors 18 in the storage part 12. FIG. 6 illustrates an example of the detection information D2. The detection information D2 includes information such as time information, obstacle detection positions, and obstacle positions. The time information is information indicating a time of detection by an obstacle sensor 18 and is included in the measurement information. The obstacle detection position is position coordinates indicating an obstacle detection position specified by the measurement distance included in the measurement information. For example, "X11, Y11" are the position coordinates of an obstacle with reference to the installation coordinates "X1, Y1" of the obstacle sensor 18F ("SS1"). For example, "X41, Y41" are the position coordinates of an obstacle with reference to the installation coordinates "X4, Y4" of the obstacle sensor 18R ("SS4"). That is, the obstacle detection position represents the position of an obstacle as viewed from each obstacle sensor 18.

The detection processing part 112 specifies (calculates) the relative position of an obstacle as viewed from the work vehicle 10. Specifically, the detection processing part 112 specifies the position coordinates of an obstacle relative to a reference point (e.g., center point) of the work vehicle 10 in an XY coordinate plane. For example, the detection processing part 112 specifies position coordinates "Xb1, Yb1" of an obstacle relative to a reference point of the work vehicle 10 on the basis of the installation coordinates "X1, Y1" of the obstacle sensor 18F ("SS1") and the detection position "X11, Y11" of the obstacle detected by the obstacle sensor 18F. Similarly, the detection processing part 112 specifies position coordinates "Xb8, Yb8" of an obstacle relative to a reference point of the work vehicle 10 on the basis of the installation coordinates "X4, Y4" of the obstacle sensor 18R ("SS4") and the detection position "X41, Y41" of the obstacle detected by the obstacle sensor 18R.

The traveling processing part 113 controls the travel of the work vehicle 10. Specifically, the traveling processing part 113 causes the work vehicle 10 to start traveling automatically upon receiving a work start instruction from the operation terminal 20. For example, when an operator presses a work start button on a manipulation screen of the operation terminal 20, the operation terminal 20 outputs a work start instruction to the work vehicle 10. The traveling processing part 113 causes the work vehicle 10 to start traveling automatically upon receiving a work start instruction from the operation terminal 20. This causes the work vehicle 10 to start traveling automatically along the travel route R and start work with the work machine 14. The travel route R to be traveled by the work vehicle 10 is generated by, for example, the operation terminal 20. The work vehicle 10 acquires the travel route R from the operation terminal 20 and travels automatically in the field F along the travel route R.

The traveling processing part 113 stops the automatic travel of the work vehicle 10 upon acquiring a travel stop instruction from the operation terminal 20. For example, when an operator presses a travel stop button on the manipulation screen of the operation terminal 20, the operation terminal 20 outputs a travel stop instruction to the work vehicle 10.

The traveling processing part 113 executes a travel restriction to restrict the automatic travel of the work vehicle 10 when the detection processing part 112 detects an obstacle. For example, when the detection processing part 112 detects an obstacle in the deceleration area K12, the traveling processing part 113 causes the work vehicle 10 to decelerate. When the detection processing part 112 detects an obstacle in the stop area K11, the traveling processing part 113 stops (emergency stop) the work vehicle 10. When the detection processing part 112 detects an obstacle in the announcement area K13, the traveling processing part 113 does not execute a travel restriction, and the detection processing device 19 issues an external alert.

In the conventional technology, when adjacent detection areas are separated by a predetermined distance, a region along the predetermined distance is a blind area or a non-detection area in which obstacles are not detected. Therefore, for example, after the work vehicle 10 transitions to deceleration travel upon detecting an obstacle in a first detection area, when the obstacle enters the non-detection area from the first detection area, the deceleration travel is canceled, and the work vehicle 10 transitions to normal travel. If the obstacle then further enters a second detection area from the non-detection area, the work vehicle 10 again shifts to deceleration travel. This causes a problem of unstable traveling of the work vehicle 10 due to the positional relationship between the detection areas, the non-detection area, and the obstacle. In particular, when the work vehicle 10 detects an obstacle while the work vehicle 10 is traveling at high speed, the operation of the work vehicle 10 transitions from deceleration, to acceleration, and then to re-deceleration. This causes a delay in response processing, i.e., a delay in the deceleration or stopping, of the work vehicle 10 and results in a problem of reduced safety. In contrast, the automatic traveling system 1 of the present embodiment can improve traveling stability of the work vehicle 10 when an obstacle is detected while ensuring the safety of the work vehicle 10.

Figure 7A:
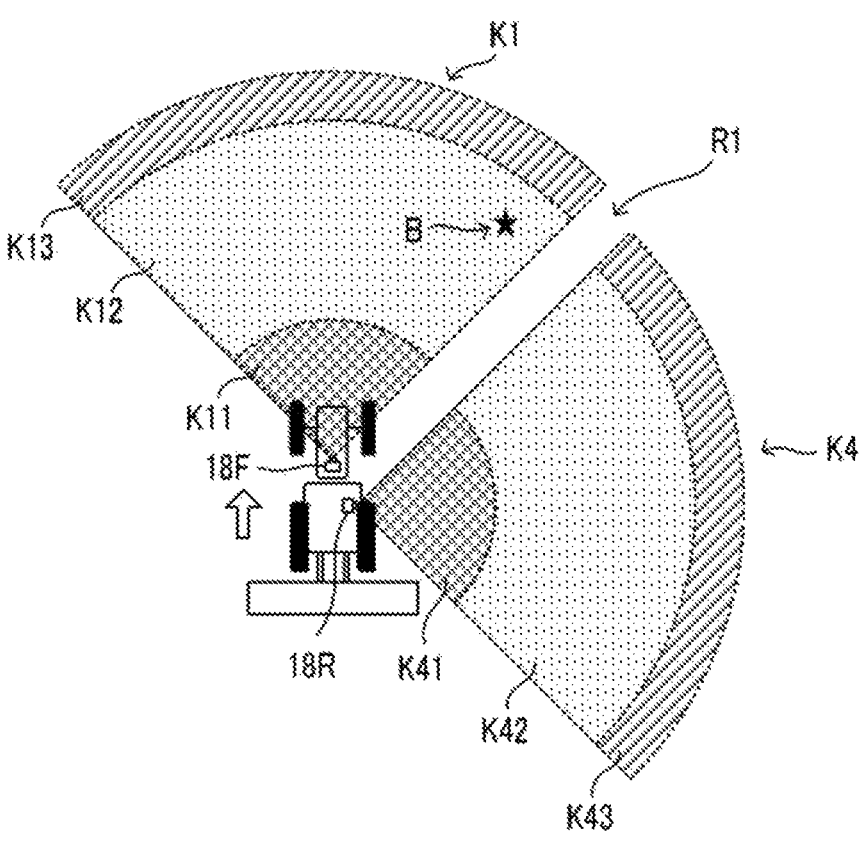
FIG. 7A is a diagram illustrating an example of a positional relationship between detection areas of obstacle sensors according to an embodiment of the present invention and an obstacle.

Specifically, as illustrated in FIG. 4, for example, there is a non-detection area R1 of a predetermined distance between the adjacent detection areas K1 and K4. For example, the obstacle sensor 18F is an example of a first detection part of the present invention, and the obstacle sensor 18R is an example of a second detection part of the present invention. The detection area K1 is an example of a first detection area of the present invention, and the detection area K4 is an example of a second detection area of the present invention. FIG. 7A illustrates the detection area K1 of the obstacle sensor 18F, the detection area K4 of the obstacle sensor 18R, and the non-detection area R1 between the detection areas K1 and K4 for simplicity of explanation. In FIG. 7A, the deceleration area K12 is an example of the first detection area of the present invention, and the deceleration area K42 is an example of the second detection area of the present invention. The first detection area of the present invention may be the entire detection area K1 or may be one of the stop area K11, the deceleration area K12, and the announcement area K13. The second detection area of the present invention may be the entire detection area K4 or may be one of the stop area K41, the deceleration area K42, and the announcement area K43.

Here, for example, when the detection processing part 112 detects an obstacle B in the deceleration area K12 of the obstacle sensor 18F while the work vehicle 10 is traveling automatically, the traveling processing part 113 executes a travel restriction of the work vehicle 10 to decelerate the work vehicle 10. Subsequently, for example, when the work vehicle 10 stops while the obstacle B remains in the deceleration area K12, the traveling of the work vehicle 10 can be resumed by removing the obstacle or moving the work vehicle 10 to avoid the obstacle.

Figure 7B:
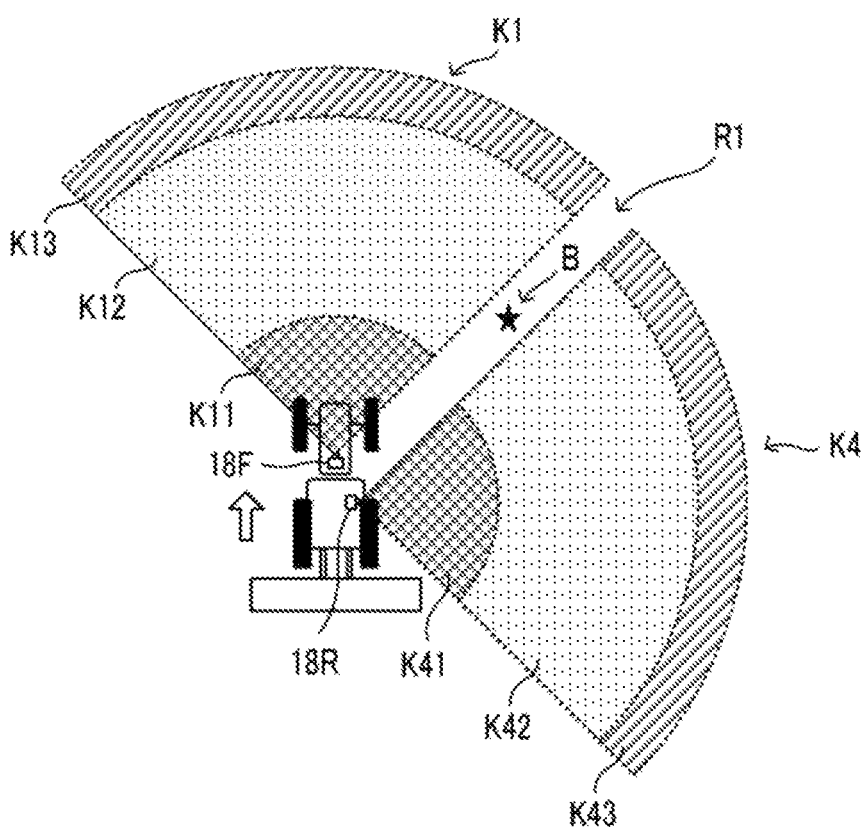
FIG. 7B is a diagram illustrating an example of a positional relationship between detection areas of obstacle sensors according to an embodiment of the present invention and an obstacle.

In contrast, for example, as illustrated in FIG. 7B, it is conceivable that the obstacle B enters the non-detection area R1 from the deceleration area K12 while the work vehicle 10 continues to decelerate. In this case, in the present embodiment, the traveling processing part 113 executes processing to continue the deceleration without canceling the deceleration. Specifically, when the obstacle B enters the non-detection area R1 from the deceleration area K12 while the traveling of the work vehicle 10 is restricted by the traveling processing part 113, the determination processing part 114 determines whether or not the obstacle B is going to further enter (there is a possibility of entering) the deceleration area K42 from the non-detection area R1.

Specifically, the determination processing part 114 determines that the obstacle B is going to enter a detection area from the non-detection area R1 when the detection area exists in the direction of relative movement of the obstacle B as viewed from the work vehicle 10. On the other hand, the determination processing part 114 determines that the obstacle B is not going to enter the detection area from the non-detection area R1 when no detection area exists in the direction of relative movement of the obstacle B as viewed from the work vehicle 10. For example, in the example illustrated in FIG. 7B, since the deceleration area K42 exists in the direction of relative movement (rearward) of the obstacle B as viewed from the work vehicle 10, the determination processing part 114 determines that the obstacle B is going to enter the deceleration area K42 from the non-detection area R1. On the other hand, for example, since no other detection area exists in the direction of relative movement (rearward) of the obstacle B as viewed from the work vehicle 10 when the obstacle B exists in the non-detection area behind the deceleration area K42, the determination processing part 114 determines that the obstacle B is not going to enter the non-detection area from another detection area.

Here, for example, the determination processing part 114 calculates the moving speed of an obstacle relative to the work vehicle 10 on the basis of the position coordinates "Xb1, Yb1", "Xb2, Yb2", and "Xb3, Yb3" of the obstacle specified by the detection processing part 112, the time information, and the traveling speed of the work vehicle 10, to calculate the position (obstacle position) of the obstacle that entered the non-detection area R1. The determination processing part 114 registers the calculated position of the obstacle in the non-detection area R1 to the detection information D2 (see FIG. 6). The obstacle positions "Xb4, Yb4" through "Xb7, Yb7" in a period Tr1 illustrated in FIG. 6 indicate the position coordinates of the obstacle in a period during which the obstacle is positioned in the non-detection area R1. In the period Tr1, the obstacle position is calculated by the determination processing part 114. The determination processing part 114 can specify the direction of relative movement of the obstacle B as viewed from the work vehicle 10 on the basis of the information on the obstacle position in the non-detection area R1.

In this way, the determination processing part 114 determines whether or not a detection area exists in the direction of relative movement of the obstacle B as viewed from the work vehicle 10 on the basis of the position of the obstacle B as viewed from the work vehicle 10, as specified from the respective pieces of detection information acquired by the acquisition processing part 111 from the respective obstacle sensors 18. The detection processing device 19 specifies the position coordinates of an obstacle relative to the reference point (center point) of the work vehicle 10. That is, the detection processing device 19 is capable of executing an obstacle tracking process both inside and outside a detection area.

The traveling processing part 113 executes a travel restriction to decelerate the work vehicle 10 when the obstacle B is detected in the deceleration area K12 by the detection processing part 112 (see FIG. 7A). The traveling processing part 113 continues the travel restriction (deceleration) of the work vehicle 10 when the determination processing part 114 determines that the obstacle B is going to enter the deceleration area K42 from the non-detection area R1 (see FIG. 7B). The traveling processing part 113 executes a travel restriction to stop the work vehicle 10 when the obstacle B is detected in the stop area K11 by the detection processing part 112. The traveling processing part 113 continues the travel restriction (stop) of the work vehicle 10 when the determination processing part 114 determines that the obstacle B is going to enter the stop area K41 from the non-detection area R1.

The traveling processing part 113 cancels the travel restriction (stop) of the work vehicle 10 when the determination processing part 114 determines that the obstacle B is not going to enter another detection area from the non-detection area. Specifically, the traveling processing part 113 returns the traveling state of the work vehicle 10 to that before the travel restriction was executed when the determination processing part 114 determines that the obstacle B is not going to enter another detection area from the non-detection area. For example, when the detection processing part 112 detects an obstacle B in the deceleration area K42 of the obstacle sensor 18R while the work vehicle 10 is traveling automatically, the traveling processing part 113 causes the work vehicle 10 to decelerate. Subsequently, for example, when the obstacle B moves outside the deceleration area K42 (to a non-detection area) and there is no other detection area behind it, the traveling processing part 113 cancels the deceleration of the work vehicle 10 and causes the work vehicle 10 to return to normal travel.

According to the above configuration, when the obstacle B passes through a non-detection area between adjacent detection areas, a change in the traveling state (for example, a change from deceleration to acceleration and then to re-deceleration) of the work vehicle 10 can be prevented, and thus traveling stability can be improved. According to the examples in FIGS. 7A and 7B, when the obstacle B is detected in deceleration area K12, the work vehicle 10 can continue to decelerate regardless of the subsequent position of the obstacle B.

As another embodiment, some or all of the information such as the sensor information D1 and the detection information D2 may be stored in the operation terminal 20 or a server (not illustrated) accessible by the work vehicle 10. In this case, the vehicle control device 11 and the detection processing device 19 may acquire the information from the operation terminal 20 or the server and execute each process, such as an automatic traveling process described later (see FIG. 8).

As described above, the detection processing device 19 is composed of a device separate from the vehicle control device 11. The detection processing device 19 comprehensively controls each obstacle sensor 18, acquires measurement information from each obstacle sensor 18, and execute an obstacle detection process. The detection processing device 19 is able to determine the position of an obstacle relative to the work vehicle 10. The detection processing device 19 outputs the detection result to the vehicle control device 11 and the operation terminal 20. As another embodiment, each function of the detection processing device 19 (the acquisition processing part 111, the detection processing part 112, and the determination processing part 114) may be included in the vehicle control device 11.

Operation Terminal 20

As illustrated in FIG. 1, the operation terminal 20 is an information processing device that includes an operation control part 21, a storage part 22, an operation display part 23, and a communication part 24. The operation terminal 20 may be composed of a portable terminal such as a tablet terminal or a smartphone.

The communication part 24 is a communication interface that connects the operation terminal 20 to the communication network N1 in a wired or wireless manner to perform data communication with an external device such as one or more work vehicles 10, via the communication network N1 according to a predetermined communication protocol.

The operation display part 23 is a user interface including a display part, such as a liquid crystal display or an organic EL display, that displays various types of information, and a manipulation part, such as a touch panel, a mouse, or a keyboard, that accepts manipulation. An operator can manipulate the manipulation part to register various types of information (work vehicle information, field information, work information, etc., as described below) on a manipulation screen displayed on the display part. An operator can also manipulate the manipulation part to issue a work start instruction, a travel stop instruction, etc., directed to the work vehicle 10. The operator can also grasp the traveling state of the work vehicle 10 automatically traveling in the field F along the travel route R by a traveling trajectory displayed on the operation terminal 20 at a site away from the work vehicle 10.

The storage part 22 is a non-volatile storage part such as an HDD or an SSD that stores various types of information. The storage part 22 stores control programs for causing the operation control part 21 to execute various control processes. For example, the control programs, which are non-transiently recorded in a computer-readable recording medium such as a CD or a DVD, are read by a predetermined reading device (not illustrated) and stored in the storage part 22. The control programs may be downloaded from a server (not illustrated) to the operation terminal 20 via the communication network N1 and be stored in the storage part 22.

The operation control part 21 includes control devices such as a CPU, a ROM, and a RAM. The CPU is a processor that executes various arithmetic processes. The ROM is a non-volatile storage part that preliminarily stores control programs such as a BIOS and an OS for causing the CPU to execute the various arithmetic processes. The RAM is a volatile or non-volatile storage part that stores various types of information and is used as a transient storage memory (workspace) for the various processes executed by the CPU. The operation control part 21 controls the operation terminal 20 by causing the CPU to execute the various control programs preliminarily stored in the ROM or the storage part 22.

As illustrated in FIG. 1, the operation control part 21 includes various processing parts such as a vehicle setting processing part 211, a field setting processing part 212, a work setting processing part 213, a path generation processing part 214, and an output processing part 215. The operation control part 21 functions as the various processing parts by causing the CPU to execute the various processes in accordance with the control programs. Some or all of the processing parts may be composed of an electronic circuit. The control programs may be programs for causing multiple processors to function as the processing parts.

The vehicle setting processing part 211 sets information regarding the work vehicle 10 (hereinafter, referred to as "work vehicle information"). The vehicle setting processing part 211 configures information such as the model of the work vehicle 10, the mounting position of the positioning antenna 174 in the work vehicle 10, the type of the work machine 14, the size and shape of the work machine 14, the position of the work machine 14 relative to the work vehicle 10, the vehicle speed and the engine speed of the work vehicle 10 while the work vehicle 10 is at work, the vehicle speed and the engine speed of the work vehicle 10 while the work vehicle 10 is turning, and the like in response to an operator manipulating the operation terminal 20 to register the information.

The field setting processing part 212 configures information regarding the field F (hereinafter, referred to as "field information"). The field setting processing part 212 configures information such as the position and shape of the field F, the work start position S at which the work starts, the work end position G (see FIG. 3) at which the work ends, and the work direction in response to the operation terminal 20 being manipulated for registration.

The work direction is a direction in which the work vehicle 10 travels while performing work with the work machine 14 in a work region that is the field F excluding non-work regions such as a headland, non-cultivated land, and the like.

The information on the position and shape of the field F can be acquired automatically, for example, by recording the transition of the position information of the positioning antenna 174 while an operator boarding the work vehicle 10 drives the work vehicle 10 one lap along the outer periphery of the field F. The position and shape of the field F can be also acquired on the basis of a polygon that is defined by multiple points designated on a map by an operator manipulating the operation terminal 20 while the map is displayed on the operation terminal 20. The region specified by the acquired position and shape of the field F is a region (travel region) in which the work vehicle 10 can travel.

The work setting processing part 213 configures information on how to specifically perform work (hereinafter, referred to as the "work information"). The work setting processing part 213 can configure, as work information, the presence or absence of cooperative work by a work vehicle 10 (unmanned tractor) and a manned work vehicle 10, the number of skips, which is the number of work routes to be skipped when the work vehicle 10 turns in a headland, the width of the headland, the width of a non-cultivated field, and the like.

The path generation processing part 214 generates the travel route R or the route on which the work vehicle 10 travels automatically on the basis of the setting information. The travel route R is, for example, a route from the work start position S to the work end position G (see FIG. 3). The travel route R illustrated in FIG. 3 is a parallel reciprocating route for the work vehicle 10 in the work region of the field F. The path generation processing part 214 can generate and store the travel route R of the work vehicle 10 on the basis of the setting information configured in the vehicle setting processing part 211, the field setting processing part 212, and the work setting processing part 213.

Specifically, the path generation processing part 214 generates the travel route R (see FIG. 3) on the basis of the work start position S and the work end position G registered in the field setting. The travel route R is not limited to the route illustrated in FIG. 3.

The output processing part 215 outputs data on the travel route R generated by the path generation processing part 214 to the work vehicle 10. For example, when an operator selects the desired travel route R on the manipulation screen and issues a work start instruction, the output processing part 215 outputs the data on the selected travel route R to the work vehicle 10.

The work vehicle 10 is configured such that the data on the travel route R generated in the operation terminal 20 is transferred to the work vehicle 10 and stored in the storage part 12 and is configured such that the work vehicle 10 can travel autonomously along the travel route R while the current position of the work vehicle 10 is being detected by the positioning antenna 174. The current position of the work vehicle 10 usually coincides with the position of the positioning antenna 174.

The work vehicle 10 is formed to be able to automatically travel when the current position is in the farm field F and unable to automatically travel when the current position is outside the farm field F (such as on a public road). The work vehicle 10 is also formed to be able to automatically travel when, for example, the current position coincides with the work start position S.

When an operator presses the work start button on the manipulation screen to issue a work start instruction while the current position of the work vehicle 10 coincides with the work start position S, the traveling processing part 113 starts the automatic travel of the work vehicle 10, and the work vehicle 10 starts work with the work machine 14 (see FIG. 2). That is, the operation control part 21 allows automatic travel of the work vehicle 10 on the condition that the current position coincides with the work start position S. The condition for allowing for automatic travel of the work vehicle 10 is not limited to the above condition.

The traveling processing part 113 of the work vehicle 10 causes the work vehicle 10 to automatically travel from the work start position S to the work end position G on the basis of the travel route R acquired from the operation terminal 20. The traveling processing part 113 may cause the work vehicle 10 to automatically travel from the work end position G to the entrance of the field F when the work vehicle 10 ends its work. When the work vehicle 10 is automatically traveling, the operation control part 21 can receive the state (position, traveling speed, etc.) of the work vehicle 10 from the work vehicle 10 and display this on the operation display part 23.

When the operation control part 21 acquires a detection result indicating that an obstacle has been detected from the work vehicle 10, the operation control part 21 causes the operation terminal 20 to display an image captured by the camera 15 of the obstacle detection position. This allows an operator to confirm on the operation terminal 20 the detection of an obstacle by the work vehicle 10, deceleration or stopping of the work vehicle 10, and the appearance of the obstacle.

The operation terminal 20 may be able to access a Web site (an agricultural support site) of an agricultural support service provided by a server (not illustrated) via the communication network N1. In this case, the operation terminal 20 can function as a manipulation terminal for the server by a browser program being executed by the operation control part 21. The server includes the processing parts described above to execute each of the processes.

In another embodiment, each function of the vehicle control device 11 and the detection processing device 19 described above may be included in the operation control part 21 of the operation terminal 20. That is, for example, the operation control part 21 may execute a process to detect an obstacle by acquiring measurement information from each of the obstacle sensors 18 of the work vehicle 10 and to control the traveling state of the work vehicle 10.

[Automatic Travel Process]

Figure 8:
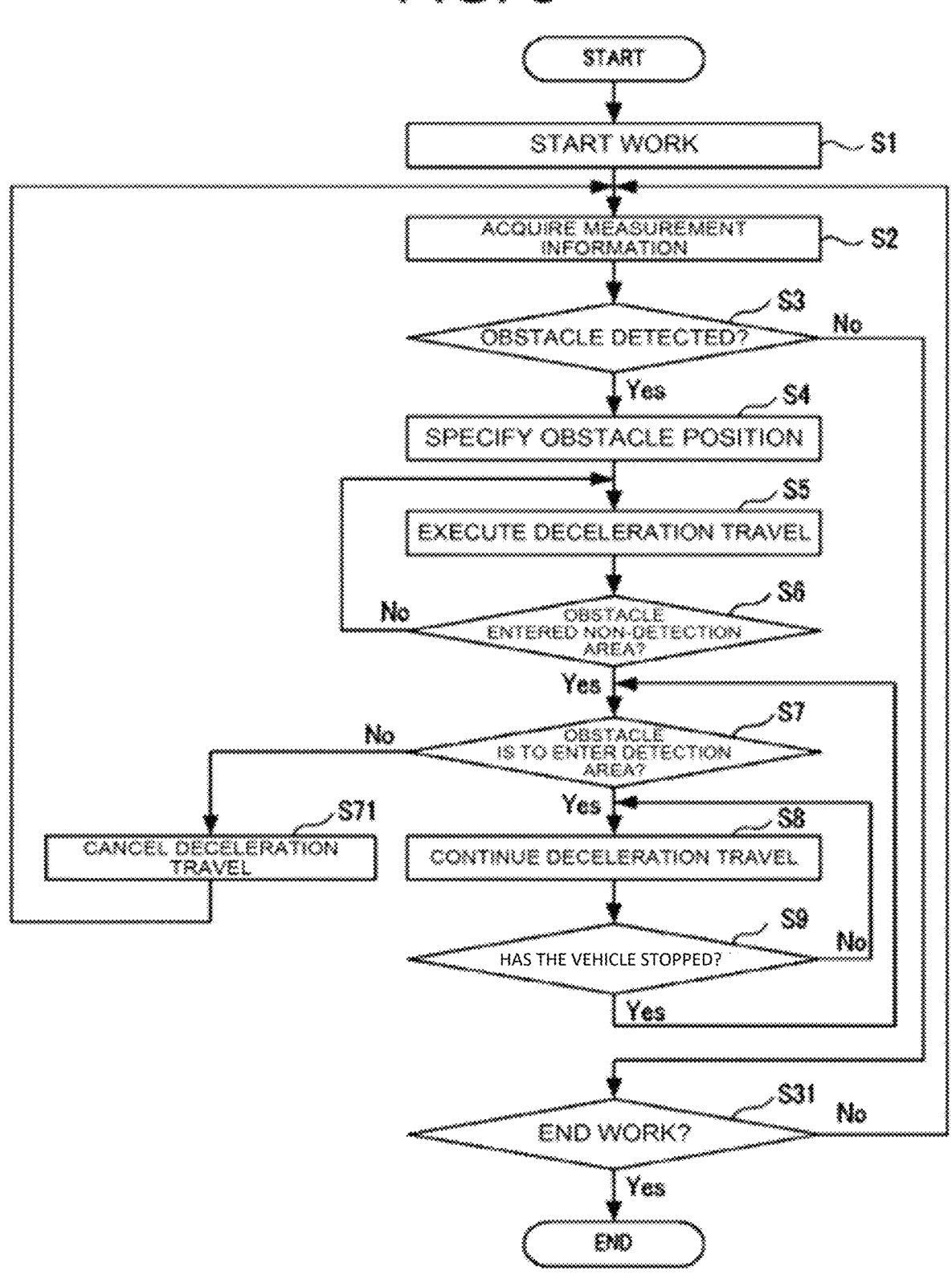
FIG. 8 is a flowchart illustrating an example of a procedure of an automatic traveling process executed by an automatic traveling system according to an embodiment of the present invention.

An example of the automatic traveling process executed by the vehicle control device 11 and the detection processing device 19 is explained below with reference to FIG. 8. For example, the automatic traveling process is initiated by the vehicle control device 11 and the detection processing device 19 when the work vehicle 10 starts automatic travel.

Note that the present invention may be regarded as an invention of an automatic traveling method for the vehicle control device 11 and the detection processing device 19 to execute part or all of the automatic traveling process or as an invention of an automatic traveling program for causing the vehicle control device 11 and the detection processing device 19 to execute part or all of the automatic traveling method. One or more processors may execute the automatic traveling process.

In step S1, the vehicle control device 11 causes the work vehicle 10 to start work. For example, when an operator presses a work start button on a manipulation screen of the operation terminal 20, the operation control part 21 outputs a work start instruction to the work vehicle 10. Upon reception of the work start instruction from the operation terminal 20, the vehicle control device 11 causes the work vehicle 10 to start automatic travel. This causes the work vehicle 10 to start traveling automatically along the travel route R and start work with the work machine 14.

In step S2, the detection processing device 19 acquires measurement information from each obstacle sensor 18 installed in the work vehicle 10.

Next, in step S3, the detection processing device 19 detects an obstacle on the basis of the acquired measurement information. Specifically, the detection processing device 19 determines whether or not a detection area contains an obstacle on the basis of a measured distance included in the measurement information. If the detection processing device 19 detects an obstacle (S3: Yes), the process proceeds to a step S4. Meanwhile, if the detection processing device 19 does not detect an obstacle (S3: No), the process proceeds to step S31.

In step S31, the vehicle control device 11 determines whether or not the work vehicle 10 has ended the work. If the work vehicle 10 has ended the work (S31: Yes), the automatic traveling process ends. Meanwhile, if the work vehicle 10 has not ended the work (S31: No), the process returns to the step S2. In this way, if an obstacle is not detected, the vehicle control device 11 and the detection processing device 19 travels and performs work while acquiring measurement information until predetermined work is ended.

The detection processing device 19 outputs a detection result to the operation terminal 20. Upon acquiring the result of detecting an obstacle from the work vehicle 10, the operation control part 21 causes the operation terminal 20 to display a captured image of the obstacle.

In step S4, the detection processing device 19 specifies the position of the obstacle. Specifically, the detection processing device 19 specifies the position coordinates of the obstacle (obstacle position) relative to a reference point (e.g., center point) of the work vehicle 10 in an XY coordinate plane (see FIG. 6).

In step S5, the vehicle control device 11 executes a travel restriction to restrict the automatic travel of the work vehicle 10. For example, when an obstacle B is detected in the deceleration area K12 (see FIG. 7A), the vehicle control device 11 decelerates the work vehicle 10.

In step S6, the detection processing device 19 determines whether or not the obstacle B has entered the non-detection area R1. If the obstacle B entered the non-detection area R1 (see FIG. 7B) (S6: Yes), the process proceeds to step S7. If no obstacle enters the non-detection area R1 (S6: No), the process returns to step S5.

In step S7, the detection processing device 19 determines whether or not the obstacle B is going to enter the deceleration area K42 from the non-detection area R1. The detection processing device 19 determines whether or not the obstacle B is going to enter the deceleration area K42 from the non-detection area R1 on the basis of the position coordinates of the obstacle B (the obstacle position in FIG. 6) with reference to the work vehicle 10. Specifically, the detection processing device 19 determines that the obstacle B is going to enter a detection area from the non-detection area R1 when the detection area exists in the direction of relative movement of the obstacle B as viewed from the work vehicle 10. On the other hand, the detection processing device 19 determines that the obstacle B is not going to enter the detection area from the non-detection area R1 when no detection area exists in the direction of relative movement of the obstacle B as viewed from the work vehicle 10. If the obstacle B is going to enter the deceleration area K42 from the non-detection area R1 (see FIG. 7B) (S7: Yes), the process proceeds to step S8. Meanwhile, if the obstacle B is not going to enter the non-detection area R1 from another detection area (S7: No), the process returns to step S71.

In step S8, the vehicle control device 11 continues the travel restriction. For example, the vehicle control device 11 continues to decelerate the work vehicle 10. The process then proceeds to step S9.

In contrast, in step S71, the vehicle control device 11 cancels the travel restriction. For example, the vehicle control device 11 cancels the deceleration of the work vehicle 10 and returns to normal travel. The process then returns to step S2.

In step S9, the vehicle control device 11 determines whether or not the work vehicle 10 has stopped. If the work vehicle 10 has stopped (S9: Yes), the process returns to step S7. If the work vehicle 10 has not stopped (S9: No), the process returns to step S8.

The vehicle control device 11 and the detection processing device 19 repeat the processes explained above until the work vehicle 10 ends the work.

As explained above, the automatic traveling system 1 according to the present embodiment acquires detection information from a first obstacle sensor that detects obstacles in a first detection area set around the work vehicle 10 and a second obstacle sensor that detects obstacles in a second detection area set with the non-detection area provided in at least a portion of the area between the first detection area and the second detection area, and detects the obstacle based on the detection information. The automatic traveling system 1 executes a travel restriction of the work vehicle when an obstacle is detected in the first detection area and determines whether or not the obstacle is going to further enter the second detection area from the non-detection area when the obstacle enters the non-detection area from the first detection area while the travel restriction is executed on the work vehicle 10. If the automatic traveling system 1 determines that the obstacle is going to enter the second detection area from the non-detection area, the travel restriction of the work vehicle 10 is continued.

This can prevent a change in the traveling state (for example, a change from deceleration to acceleration and then to re-deceleration) of the work vehicle 10 when the obstacle B passes through a non-detection area between adjacent detection areas, and thus traveling stability can be improved. Since the position of the obstacles as viewed from the work vehicle 10 can be determined (tracked), the safety of the work vehicle 10 can be ensured. Each of the obstacle sensors 18 can share the position of an obstacle in real time.

The present invention is not limited to the above embodiments, but may be the following.

As another embodiment of the present invention, the detection processing device 19 may set a detection area of each obstacle sensor 18 on the basis of predetermined conditions. Specifically, the detection processing device 19 sets the detection area on the basis of at least one of the following: the position of the work machine 14 mounted to the work vehicle 10, the width (lateral width) of the work machine 14 in the direction orthogonal to the advancing direction of the work vehicle 10, and the traveling speed of the work vehicle 10.

Figure 9:
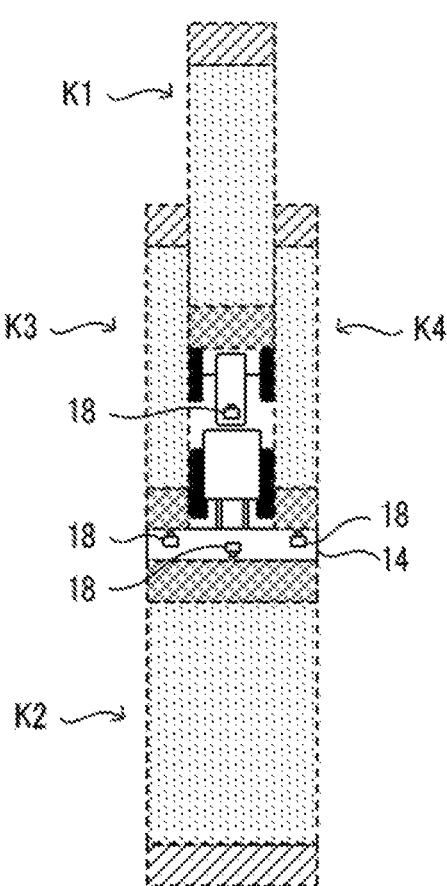
FIG. 9 is a diagram illustrating an example of positions and detection areas of obstacle sensors installed on a work vehicle according to an embodiment of the present invention.

FIG. 9 illustrates a case in which the work machine 14 is the cultivator. The work machine 14 is provided with obstacle sensors 18 at the front left, front right, and center rear. The detection processing device 19 sets a forward detection area K1 corresponding to the lateral width of the work vehicle 10, a rear detection area K2 corresponding to the lateral width of the work machine 14, a left forward detection area K3 corresponding to the left end of the work machine 14, and a right forward detection area K4 corresponding to the right end of the work machine 14.

Figure 10:
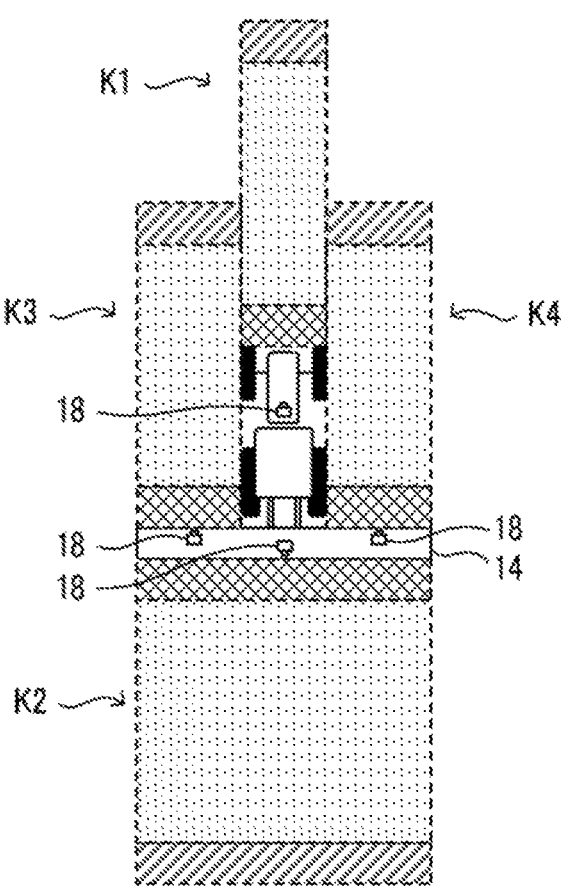
FIG. 10 is a diagram illustrating an example of positions and detection areas of obstacle sensors installed on a work vehicle according to an embodiment of the present invention.

FIG. 10 illustrates a case in which the work machine 14 is the puddling machine. Similar to the cultivator illustrated in FIG. 9, the detection processing device 19 sets the detection area K1 corresponding to the lateral width of the work vehicle 10 and the detection areas K2, K3, and K4 corresponding to the lateral width of the work machine 14.

Figure 11:
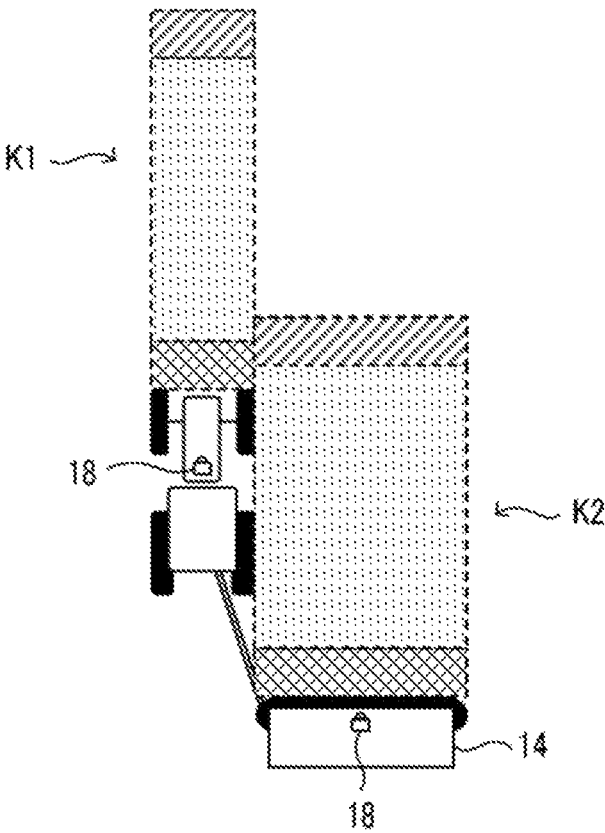
FIG. 11 is a diagram illustrating an example of positions and detection areas of obstacle sensors installed on a work vehicle according to an embodiment of the present invention.

FIG. 11 illustrates a case in which the work machine 14 is a mower that is mounted offset to the left or right side of the work vehicle 10. The work vehicle 10 performs mowing work or the like when the work machine 14 of a direct mount type is mounted offset to the left or right side and travels in the field. Here, the work machine 14 is not limited to a mower of a direct mount type that is fixed to the work vehicle 10, and may be a mower of a towed type that is towed by the work vehicle 10. The work machine 14 has an obstacle sensor 18 at the center front. The detection processing device 19 sets the forward detection area K1 corresponding to the lateral width of the work vehicle 10 and the forward detection area K2 corresponding to the lateral width of the work machine 14. The work vehicle 10 illustrated in FIG. 11 is an example case in which it travels in a clockwise direction from the outer periphery of the field F to the inner periphery.

The work machine 14 described above is an example, and other work machines are also included in the present invention. The obstacle sensors 18 are installed in accordance with the type of work machine 14, and the detection processing device 19 sets detection areas corresponding to the respective obstacle sensors 18 in accordance with the type of work machine 14.

The detection processing device 19 may also set a detection area on the basis of the traveling speed of the work vehicle 10. For example, the detection processing device 19 sets a detection area so that the lateral width of the detection area increases as the traveling speed of the work vehicle 10 increases.

The detection processing device 19 may set different detection areas for a straight route and a turning route to be traveled by the work vehicle 10. For example, the detection processing device 19 sets a wide detection area on the forward side in the straight route and a wide detection area in the turning direction in the turning route. In such a case, it is assumed that the width of the work machine differs between working and non-working conditions, such as in a spraying work machine.

The detection processing device 19 may set different detection areas for a first straight route to be traveled by the work vehicle 10 in a first direction and a second straight route to be traveled by the work vehicle 10 in a second direction different from the first direction. For example, on the reciprocating straight route, the detection processing device 19 sets a wide detection area on the right side of the first straight route that is an outward route, and a wide detection area on the left side of the second straight route that is a return route. In such a case, as with a reversible plow, it is assumed that the position of the work machine 14 is different on the left and right sides on the outward and return routes.

In this way, the detection processing device 19 may set multiple detection areas for a single obstacle sensor 18 and switch between the detection areas in accordance with the type of travel route traveled automatically by the work vehicle 10.

[Reference Mode].

The above-described configuration (see FIGS. 9 to 11) for setting detection areas for the respective obstacle sensors 18 on the basis of predetermined conditions can also be applied to an automatic traveling system that does not include the above-described configuration to solve the problem of the traveling state of the work vehicle 10 changing (for example, deceleration changing to acceleration and then to re-deceleration) when an obstacle passes through a non-detection area.

Here, a problem that arises in conventional systems will be described. For example, when the work vehicle 10 performs different types of work, it is necessary to replace the work machine 14 for each type of work. However, because the size and attachment position of the work machine 14 differ depending on the model, an unnecessary travel restriction is executed if the detection areas of the obstacle sensors 18 (detection area K1, etc.) are set within a certain range, regardless of the model of the work machine 14, and this results in a problem of reduced work efficiency.

The automatic traveling system according to the reference mode has a configuration that solves the above problem. The following is a list of specific configurations of the automatic traveling system according to the reference mode.

<Appendix 1>

An automatic traveling system includes:

a setting processing part (detection processing device 19) that is installed on a work vehicle 10 and sets a detection area (e.g., detection area K1) for controlling travel of the work vehicle 10 in a detectable area K0 of a detection part (obstacle sensor 18) that detects an obstacle;

an acquisition processing part 111 that acquires detection information from the detection part;

a detection processing part 112 that detects the obstacle on the basis of the detection information acquired by the acquisition processing part 111; and a traveling processing part 113 that executes a travel restriction of the work vehicle 10 when the obstacle is detected in the detection area by the detection processing part 112, wherein, the setting processing part sets the detection area on the basis of at least one of a position of a work machine 14 mounted on the work vehicle 10, a width of the work machine 14 in a direction orthogonal to an advancing direction of the work vehicle 10, and a traveling speed of the work vehicle 10.

<Appendix 2>

The automatic traveling system described in Appendix 1, wherein the detection area is set to be different for each of a straight route and a turning route to be traveled by the work vehicle 10.

<Appendix 3>

The automatic traveling system described in Appendix 1 or 2, wherein the detection area is set differently in each of a first straight route in which the work vehicle 10 travels in a first direction and a second straight route in which the work vehicle 10 travels in a second direction different from the first direction.

In this way, the automatic traveling system of the reference mode can set the detection area for controlling the travel of the work vehicle 10 in the detectable area K0 of the obstacle sensor 18 to a range corresponding to the work machine 14. The detection processing device 19 can set the detection area on the basis of information such as the type of the work machine 14, the size and shape of the work machine 14, and the position of the work machine 14 relative to the work vehicle 10, which is included in the work vehicle information configured by the vehicle setting processing part 211.

According to the configuration of Appendix 1, since the detection area is set in accordance with the position and size (width) of the work machine 14 mounted on the work vehicle 10, a travel restriction of the work vehicle 10 is not unnecessarily executed even when the work machine 14 is replaced for each type of work, and thus reduction in work efficiency can be prevented. Even if the traveling speed of the work vehicle 10 differs for each work machine 14 to be mounted, safety can be enhanced because the detection area is set in accordance with the traveling speed.

According to the configuration of Appendix 2, for example, when the width of the work machine 14 during turning is made smaller than the width of the work machine 14 during straight traveling, the range of a travel restriction can be kept at the required minimum by narrowing the detection area during turning while false detection can be reduced, and thus safety can be enhanced.

According to the configuration of Appendix 3, since the detection area is set in accordance with the travel route when the direction of the work machine 14 changes for each travel route such as with a reversible plow, the range of a travel restriction can be kept at the required minimum by narrowing the detection area during turning while false detection can be reduced, and thus safety can be enhanced.

The configuration according to the reference mode may be added to the automatic traveling system 1 according to the embodiments described above.

The invention claimed is:

1. An automatic traveling method comprising:
acquiring detection information from a first detection part and a second detection part, the first detection part configured to detect an obstacle in a first detection area set around a work vehicle, the second detection part configured to detect the obstacle in a second detection area set around the work vehicle with a non-detection area provided in at least a portion of an area between the first detection area and the second detection area;
detecting the obstacle based on the detection information;
executing a travel restriction of the work vehicle when the obstacle is detected in the first detection area, wherein the travel restriction decelerates or stops the work vehicle;
determining that the obstacle is not going to further enter the second detection area from the non-detection area when the obstacle enters the non-detection area from the first detection area while the travel restriction is imposed on the work vehicle; and
removing the travel restriction of the work vehicle in response to determining that the obstacle is not going to further enter the second detection area.

2. The automatic traveling method of claim 1, wherein the work vehicle returns to a traveling state before the travel restriction when the travel restriction is removed.

3. The automatic traveling method of claim 1, wherein it is determined that the obstacle is not going to enter the second detection area from the non-detection area when the second detection area does not exist in a direction of relative movement of the obstacle as viewed from the work vehicle.

4. The automatic traveling method of claim 3, further comprising determining whether or not the second detection area exists in the direction of relative movement of the obstacle as viewed from the work vehicle on a basis of a position of the obstacle as viewed from the work vehicle, as specified from respective pieces of detection information acquired from the first detection part and the second detection part.

5. The automatic traveling method of claim 1, wherein the first detection area and the second detection area are set based on a position of a work machine to be mounted to the work vehicle, a width of the work machine in a direction orthogonal to an advancing direction of the work vehicle, a traveling speed of the work vehicle, or a combination thereof.

6. The automatic traveling method of claim 1, wherein the first detection area and the second detection area are set differently for a straight route and a turning route to be traveled by the work vehicle.

7. The automatic traveling method of claim 1, wherein the first detection area and the second detection area are set differently in a first straight route and a second straight route, the first straight route being a route to be traveled by the work vehicle in a first direction, the second straight route being route to be traveled by the work vehicle in a second direction different from the first direction.

8. An automatic traveling system comprising:
an acquisition processing part configured to acquire detection information from a first detection part and a second detection part, the first detection part configured to detect an obstacle in a first detection area set around a work vehicle, the second detection part configured to detect the obstacle in a second detection area set around the work vehicle with a non-detection area provided in at least a portion of an area between the first detection area and the second detection area;
a detection processing part configured to detect the obstacle based on the detection information acquired by the acquisition processing part;
a traveling processing part configured to execute a travel restriction of the work vehicle when the obstacle is detected in the first detection area by the detection processing part, wherein the travel restriction decelerates or stops the work vehicle; and
a determination processing part configured to determine that the obstacle is not going to further enter the second detection area from the non-detection area when the obstacle enters the non-detection area from the first detection area while the travel restriction is imposed on the work vehicle by the traveling processing part,
wherein the traveling processing part removes the travel restriction of the work vehicle in response to determining that the obstacle is not going to further enter the second detection area by the determination processing part.

9. A non-transitory, computer-readable storage medium having stored thereon an automatic travel program that, when executed by one or more processors, causes the one or more processors to perform operations comprising:
acquiring detection information from a first detection part and a second detection part, the first detection part configured to detect an obstacle in a first detection area set around a work vehicle, the second detection part configured to detect the obstacle in a second detection area set around the work vehicle with a non-detection area provided in at least a portion of an area between the first detection area and the second detection area;
detecting the obstacle based on the detection information;
executing a travel restriction of the work vehicle when the obstacle is detected in the first detection area, wherein the travel restriction decelerates or stops the work vehicle;
determining that the obstacle is not going to further enter the second detection area from the non-detection area when the obstacle enters the non-detection area from the first detection area while the travel restriction is imposed on the work vehicle; and
removing the travel restriction of the work vehicle in response to determining that the obstacle is not going to further enter the second detection area.

* * * * *